R. N. WILKINSON.
CHILD'S VEHICLE.
APPLICATION FILED MAR. 16, 1918.
1,268,310.
Patented June 4, 1918.
2 SHEETS—SHEET 1.
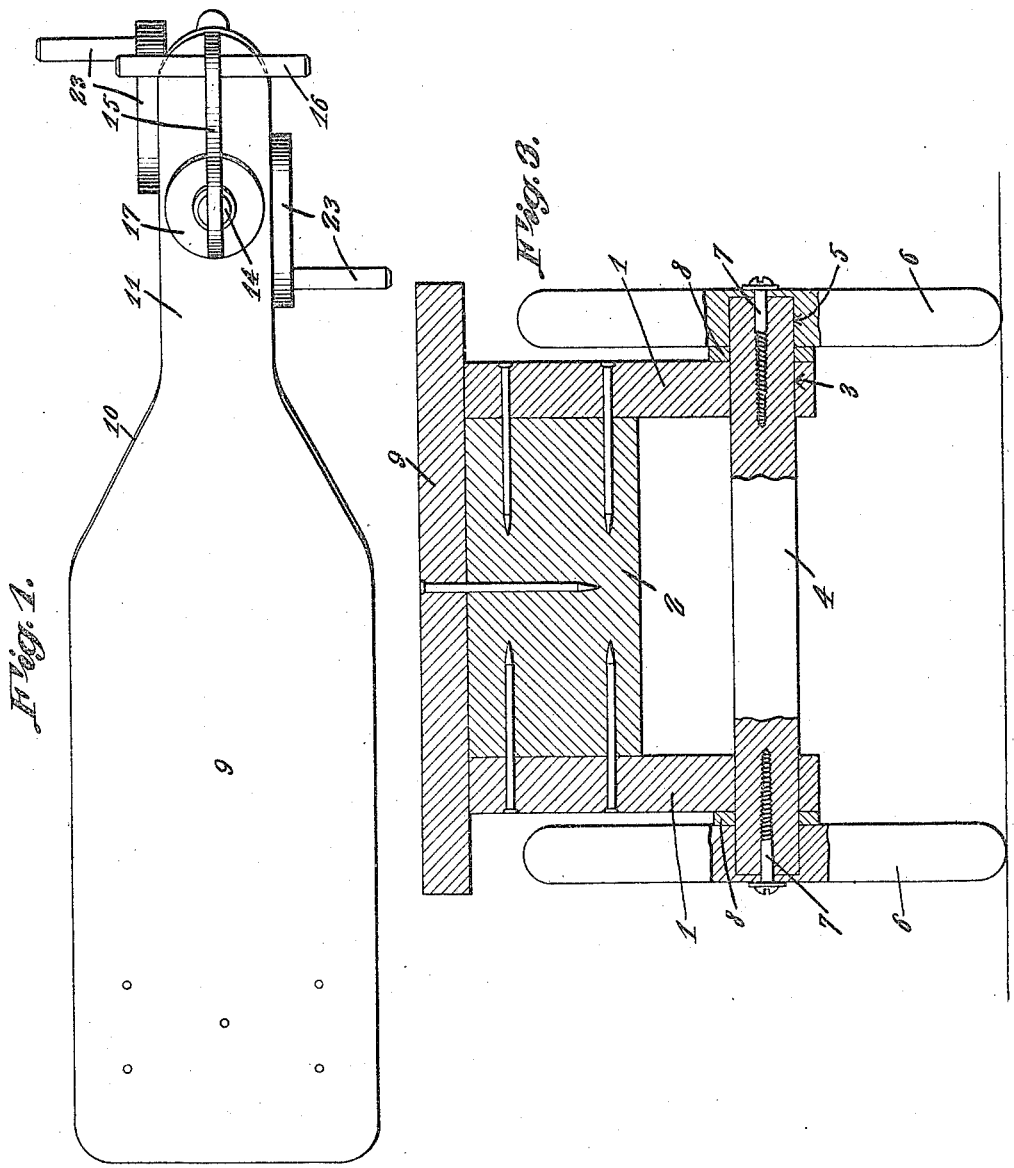
R. N. Wilkinson, Inventor
Witness
F. B. Wooden.
By C. A. Snow & Co.
Attorneys

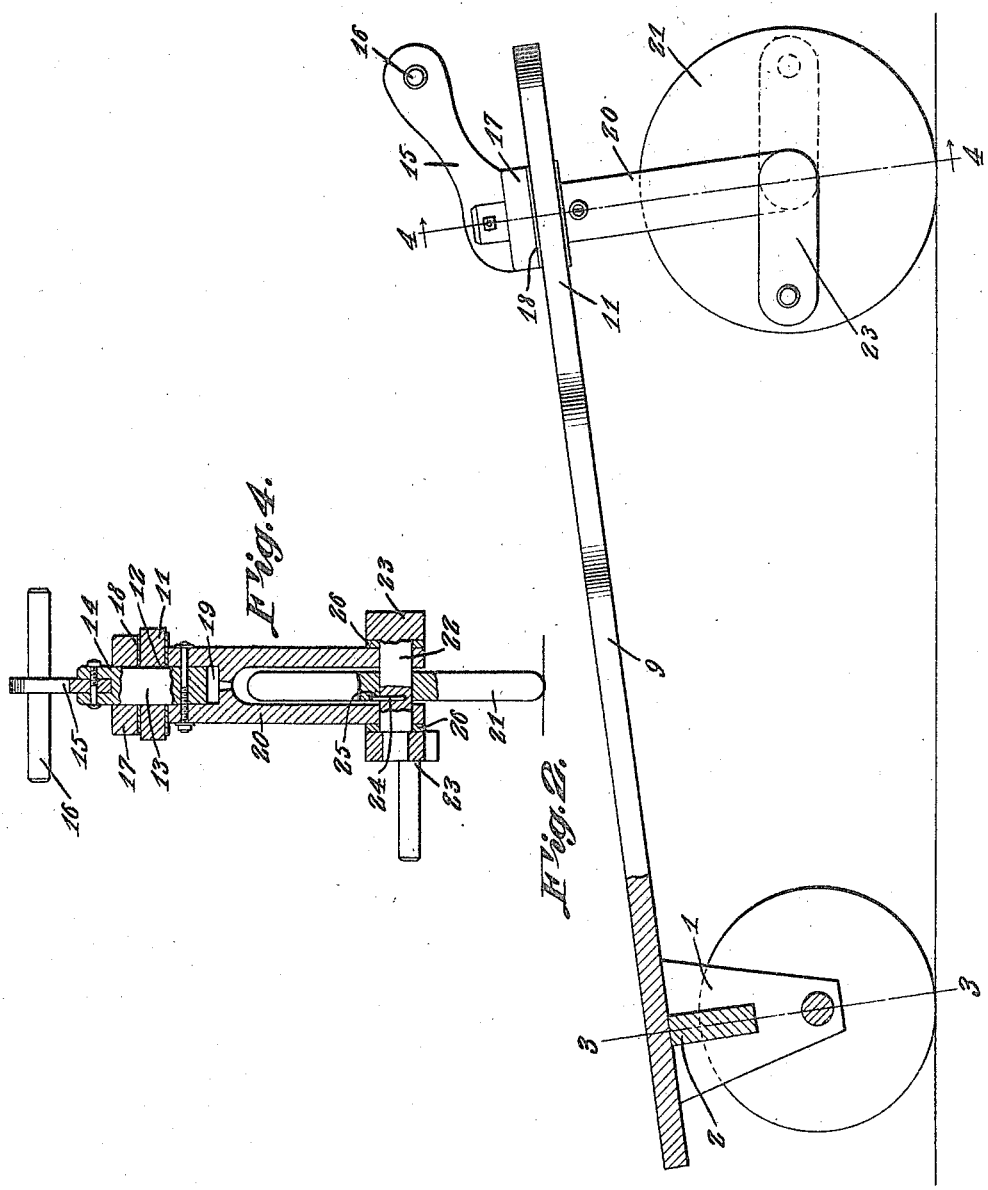

UNITED STATES PATENT OFFICE.

RANDOLPH N. WILKINSON, OF HUNTINGTON, WEST VIRGINIA.

CHILD'S VEHICLE.

1,268,310.

Specification of Letters Patent.

Patented June 4, 1918.

Application filed March 16, 1918. Serial No. 222,880.

*To all whom it may concern:*

Be it known that I, RANDOLPH N. WILKINSON, a citizen of the United States, residing at Huntington, in the county of Cabell and State of West Virginia, have invented a new and useful Child's Vehicle, of which the following is a specification.

This invention relates to vehicles for use by children, one of its objects being to provide a structure which is practically all wood and which will not only afford pleasure to the user but will also constitute means for developing the arms and chest.

A further object is to provide a vehicle designed to be propelled by hand and which will support the body of the occupant in an inclined position thus to give freedom of movement to the muscles of the chest and arms.

A further object is to so construct the vehicle as to render it freely movable and capable of supporting a load far in excess of any that might be placed thereon by the child using it.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings

Figure 1 is a plan view of the vehicle.

Fig. 2 is a side elevation thereof, the rear portion being shown in section.

Fig. 3 is a section on line 3—3, Fig. 2.

Fig. 4 is a section on line 4—4, Fig. 2.

Referring to the figures by characters of reference, 1 designates side blocks secured to the ends of a cross strip 2 thus to constitute the rear bolster of the vehicle. Holes are bored in the lower portions of the blocks 1, as shown at 3, and mounted for rotation in these holes in the axle 4. In practice this axle has been made of hickory and the bolster of maple and the axle has rotated freely in its bearings when subjected to the heaviest loads. The ends of the axle are extended into bores 5 extending partly through the centers of the rear wheels 6 which are wooden disks turned to proper size and shape. One end of the axle is glued in the bore 5 of one of the wheels while the other wheel is adapted to rotate freely on the axle. Screws 7 are extended into the centers of the wheels and into the ends of the axles thus to prevent the wheels from pulling off of the axle. These screws also constitute reinforcing cores extending inwardly past the bearings in which the axle is journaled, thus to reinforce the axle at those points where subjected to the greatest strain and most likely to break. Wooden washers 8 are arranged on the axle between the wheels 6 and the blocks 1.

Secured upon the bolster formed of the blocks 1 and strip 2 is the rear portion of the body 9 of the vehicle. This body is formed of a board of sufficient width and length to permit a child to lie thereon comfortably, and the sides of the body converge, near the front, as at 10, and merge into the sides of a forwardly extending tongue 11 integral with the body. This tongue has an opening 12 therein for the reception of a wooden pin 13 the upper end of which can be forked, as at 14 to receive an arm 15 adapted to extend forwardly therefrom, as shown in Fig. 2. A cross piece 16 may be extended through the end portion of the handle to form a grip. The upper portion of the pin 13 is fitted snugly within a wooden disk 17 and a thin metal wear plate 18 may be interposed between this disk and the top of the tongue 11.

The lower end of the pin 13 is extended into a socket 19 formed in the upper end of a steering head 20 consisting of a block of suitable wood, such as maple the lower end of which is forked to receive the front wheel 21 of the vehicle. This wheel is in the form of a wooden disk of greater diameter than the wheels 6 and mounted on an axle 22 of wood which is journaled in the forked end of the head 20. The ends of the axle are secured within oppositely extended cranks 23 formed of wood and which can be attached to the axle 22 in any manner desired. The wheel 21 is preferably attached to the axle by driving a metal pin 24 into the axle and then driving the wheel laterally along the axle until the projecting end of the pin becomes seated in a notch 25 in one side of the wheel. Wooden washers 26 can be interposed between the cranks 23 and the sides of the head 20.

The pin 13 is preferably secured in the socket 19 by a bolt 27, as shown and a thin metal wear plate 28 is preferably interposed between the bottom of the tongue 11 and the top of the head 20.

It will be noted that the parts are so proportioned as to hold the body 9 in an inclined position. Thus the occupant of the vehicle will lie in an inclined position and, by reaching down at opposite sides of the tongue 11, can grasp the cranks 23 and propel the vehicle. As the body is inclined the muscles of the chest will not be cramped and the user can readily propel the vehicle whereas, should one lie in a horizontal position, it becomes practically impossible to operate the vehicle in this manner without creating considerable fatigue. The manner of propelling the vehicle from an inclined body has been found to be very beneficial in straightening the back, throwing back the shoulders and developing the chest and for these reasons, as well as the entertainment afforded, the vehicle has been prescribed by physicians and used by invalid children. The particular construction of the vehicle enables it to support very heavy loads, two hundred and fifty pounds or more often being carried without injury.

What is claimed is:—

1. A child's vehicle including a pair of rear supporting wheels, a front supporting wheel of greater diameter than the rear wheels, a body supported by the wheels and inclined upwardly and forwardly to hold the body of the rider in a prone but inclined position, and hand cranks revoluble with the front wheel.

2. A child's vehicle including a forwardly and upwardly inclined body for supporting the body of the user in a prone but inclined position, a combined steering and propelling wheel supporting the front of the body, a bolster connected to the rear portion of the body and including spaced bearing blocks, an axle mounted for rotation in the blocks, wheels fitted on and extending across the ends of the axle, and combined fastening and reinforcing devices extending through the wheels and into the axle past the bearing blocks.

In testimony that I claim the foregoing as my own, I have hereto affixed my signature in the presence of two witnesses.

RANDOLPH N. WILKINSON.

Witnesses:
N. S. WILLIAMS,
E. J. PAYNE.

Copies of this patent may be obtained for five cents each, by addressing the "Commissioner of Patents, Washington, D. C."